(12) United States Patent
Bratton

(10) Patent No.: US 7,741,586 B2
(45) Date of Patent: Jun. 22, 2010

(54) HEAT TRANSFER DEVICE FOR USE IN BARBEQUES

(76) Inventor: Rod Bratton, 6403 Lakeview Drive SW, Calgary, Alberta (CA) T3E 5T2

( * ) Notice: Subject to any disclaimer, the term of this patent is extended or adjusted under 35 U.S.C. 154(b) by 315 days.

(21) Appl. No.: 11/367,808

(22) Filed: Mar. 1, 2006

(65) Prior Publication Data
US 2007/0210066 A1 Sep. 13, 2007

(51) Int. Cl.
*H05B 3/06* (2006.01)
*F24C 3/12* (2006.01)

(52) U.S. Cl. ............. 219/540; 219/470; 126/41 R; 126/25 R; 431/326

(58) Field of Classification Search ........... 219/540, 219/470; 126/41 R, 25 R; 431/326
See application file for complete search history.

(56) References Cited

U.S. PATENT DOCUMENTS

| | | | |
|---|---|---|---|
| 1,501,784 A | | 7/1924 | Kingman |
| 1,614,746 A | | 1/1927 | Lyon |
| 2,278,926 A | * | 4/1942 | Hartwell ............... 66/202 |
| 2,390,200 A | * | 12/1945 | York ..................... 428/175 |
| 2,746,378 A | | 5/1956 | Lang |
| 3,967,613 A | * | 7/1976 | Rybak et al. ........... 126/41 R |
| 4,290,408 A | | 9/1981 | Juett |
| 4,403,597 A | | 9/1983 | Miller |
| 4,886,044 A | | 12/1989 | Best |
| 5,617,778 A | | 4/1997 | Schroeter |
| 5,755,154 A | | 5/1998 | Schroeter |
| 5,806,510 A | | 9/1998 | Fischer |
| 6,114,666 A | | 9/2000 | Best |
| 6,640,799 B2 | | 11/2003 | Kahler |

* cited by examiner

*Primary Examiner*—Shawntina Fuqua
(74) *Attorney, Agent, or Firm*—Heslin Rothenberg Farley & Mesiti P.C.; Victor A. Cardona, Esq.

(57) ABSTRACT

The invention relates generally to heat transfer devices for natural gas or propane barbeques. More particularly, the invention relates to the use of a knitted wire mesh with an open loop structure as a heat transfer device in barbeques.

13 Claims, 5 Drawing Sheets

23

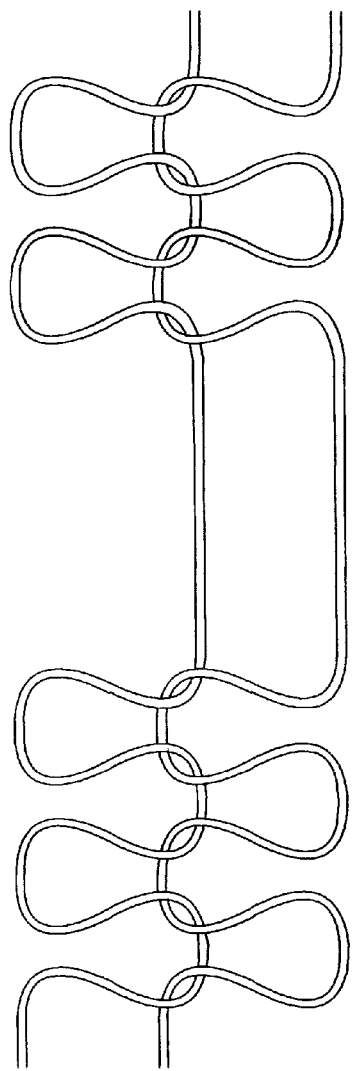
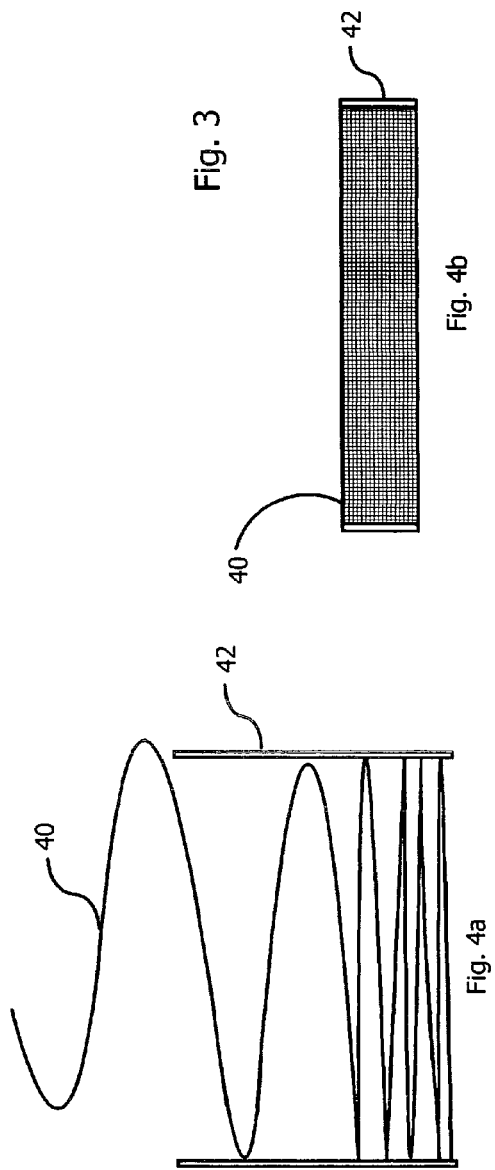

HEAT TRANSFER DEVICE FOR USE IN BARBEQUES

FIELD OF THE INVENTION

The invention relates generally to heat transfer devices for natural gas or propane barbeques. More particularly, the invention relates to the use of a knitted wire mesh with an open loop structure as a heat transfer device in barbeques.

BACKGROUND OF THE INVENTION

Barbeques have steadily evolved over the centuries from the earliest open fires, to simple grills placed over burning charcoal to the modern gas barbeque. While the modern gas barbeque is very convenient as compared to open fire or charcoal cooking, it is often limited by the quality of heat used to cook foods and by the flavour that may be introduced into the cooking foods. Moreover, the modern gas barbeque is often seriously affected by grease fires that may burn or otherwise impart undesirable flavours into cooking foods.

That is, as the modern gas barbeque does not combust wood or charcoal, smoke flavours can generally only be introduced into cooking foods by burning drippings from the food. As such, the modern barbeque can incorporate a variety of heat transfer devices such as lava rocks, ceramic blocks or thin metal plates above the burner, that seek to effectively cause food drippings to burn to create flavour.

Furthermore, the gas flame of a modern gas barbeque does not provide an even heat source as the typical gas barbeque with a gas flame produces a significant temperature gradient between the hottest parts of the flame and those locations where there is no flame. Accordingly, in addition to providing an effective vaporizing surface for juices, the heat transfer devices also seek to effectively distribute heat in order to enable the even cooking of food.

A well known example of a heat transfer device that is limited in its effectiveness is lava rocks. Specifically, while lava rocks are intended to a) distribute the heat from the burners below, and b) collect and vaporize juices from the food within the pores of the rocks, over time, drippings of excess fat and other juices will clog the pores of the lava rocks, resulting in uneven heat distribution and increased flare-ups. As a result, lava rocks require periodic cleaning and/or replacement. Moreover, the porosity of lava rocks renders them relatively poor conductors of thermal energy.

A review of the prior art reveals that while numerous systems have been developed in the past to address various limitations in barbeques, there remains a need for heat transfer devices that continue to improve the quality of barbeque cooking.

For example, U.S. Pat. No. 4,403,597 attempts to improve upon the lava rock system by using a cast iron plate as a heat transfer device. The plate is placed above the burner manifolds of the barbecue and below the grill to radiate heat from the burner to the food above. Food drippings are vaporized or combusted atop the iron plate, the debris from which may be scraped from the surface upon cooling. However, over time, accumulation of charred debris on the plate reduces effective heat distribution to the food. Moreover, although cast iron is a good conductor of thermal energy, it is not a convenient heat transfer device for use in barbecues as it is heavy, cumbersome to manipulate, requires a significant length of time to heat and cool and therefore does not readily facilitate temperature adjustment during use.

U.S. Pat. No. 6,114,666 teaches the use of a glass/ceramic-glass material as a heat transfer device. The glass/ceramic-glass material is placed above the barbecue burner but below the cooking grill which, when heated, acts as an infrared emitter. This material, may however, still collect a buildup of burnt food drippings leading to uneven heating and flare-ups.

Other heat radiating devices are known in the art for distributing heat from a various types of burners. For example, U.S. Pat. No. 1,614,746 teaches the use of wire gauze between the burner manifolds of a broiler to aid in the even distribution of heat to food below. The wire gauze is brought to a temperature at which it becomes luminous thus radiating infrared heat.

In particular, there has been a need for a heat transfer device for barbecues that evenly distributes/radiates thermal energy from the heat source, will quickly respond to changes in heating temperature, while effectively vaporizing food drippings to impart barbecue flavour to food. It is further desired to have a heat transfer that can be readily cleaned of carbon build-up.

SUMMARY OF THE INVENTION

It is an object of the present invention to obviate or mitigate at least one disadvantage of previous heat transfer devices used in barbeques.

In accordance with the invention, there is provided a heat transfer device for use within a barbeque comprising at least one layer of an open loop knitted wire mesh. Preferably, the heat transfer devices includes multiple layers of open loop wire mesh that may be assembled from at least one flattened cylinder or a length of open loop knitted wire mesh. The heat transfer device may be assembled with a frame. The wire mesh may be manufactured using stainless steel wire or other materials and may comprise single or multiple strands of wire. The void space of the wire mesh may range from 50-98.5%.

In further embodiments, the invention comprises a kit for assembling a heat transfer device for a barbeque. In a first embodiment, the kit comprises: a length of a flattened open loop knitted wire cylinder, the open loop knitted wire cylinder having a flexibility allowing multiple layers of wire to be layered back and forth across one another. In a second embodiment, the kit comprises: a plurality of flattened open loop knitted wire cylinders; and, an end clamping system for clamping the plurality of open loop knitted wire cylinders together.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3 is a schematic side view of an open loop knitted mesh in which a number of loops have been dropped during manufacture;

FIG. 4A is schematic plan view showing a narrow diameter wire loop mesh being assembled into a heat transfer device in accordance with one embodiment of the invention;

FIG. 4B is a schematic side view of the heat transfer device of FIG. 4A;

DETAILED DESCRIPTION

With reference to the Figures, the invention provides a heat transfer device 10 for use in barbeques. More specifically, the invention provides a wire mesh structure having characteristics favourable for use as a heat transfer device in barbecues. The wire mesh structure, when layered in a barbecue, conducts and radiates thermal energy to the food being cooked. The inherent flexibility of the wire mesh allows for simple cleaning of carbon debris from the mesh, and facilitates packaging for commercial purposes.

Figure 1A:
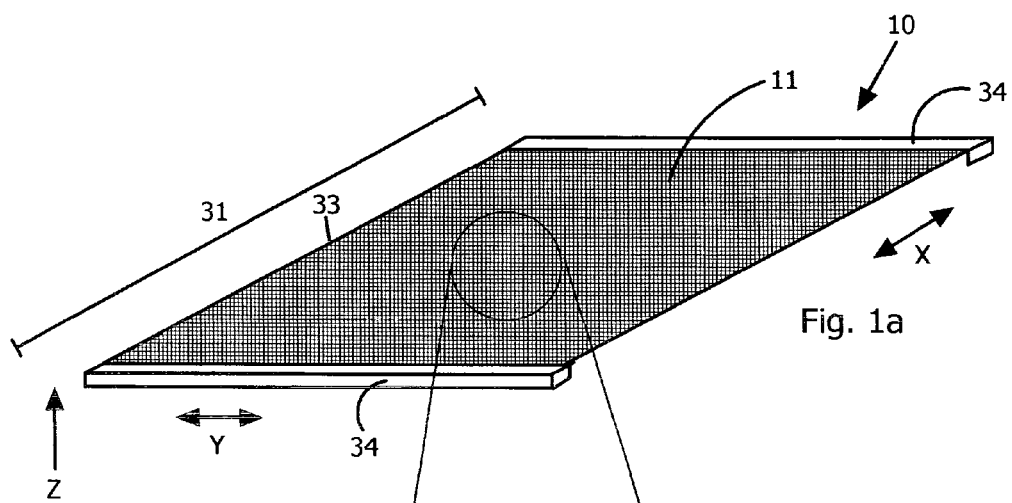
FIG. 1A is a perspective view of a heat transfer device in accordance with one embodiment of the invention.
Figure 1B:
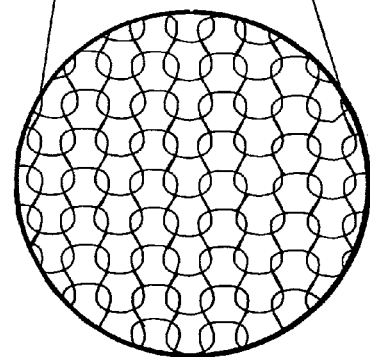
FIG. 1B is an exploded view of FIG. 1A showing detail of an open-loop knitted mesh.
Figure 1C:
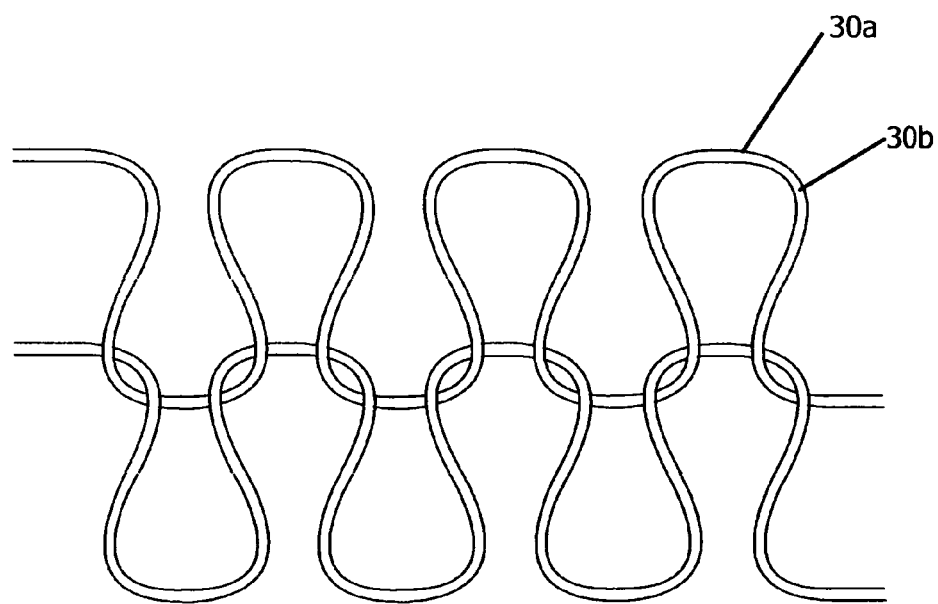
FIG. 1C is a schematic view of an open-loop knitted mesh having multiple strands of wire.

With reference to FIGS. 1A and 1B, the wire mesh of the invention is knitted from metal wire 11 such that each loop 10a of wire interlocks with adjacent loops of wire at four contact points. The interlocked knitted structure of the wire mesh therefore readily facilitates heat conduction between and along adjacent loops of wire during heating of the mesh by a localized heat source. Thus, when the mesh of the invention is placed above a heat source within a barbecue, the mesh can quickly be heated or cooled in response to adjustment of the burner temperature along the multiple tortuous paths defined by the knitted wire structure. As illustrated in FIG. 1C, multiple strands of wire 30a, 30b can be knitted to form the knitted structure Wires 30a, 30b can be of a similar or dissimilar material.

The knitted wire mesh is formed from wire having a composition and diameter (typically 0.001" to 0.065" and preferably 0.01") suitable to provide durability to the finished product, while still possessing thermal conductive properties for rapid dissipation of heat between adjacent loops and thereby allowing an acceptable heating/cooling time in response to burner heat adjustments. Open loop knitted wire is further characterized by having a high surface area to weight ratio thus providing a high surface area for heating and vaporizing food juices while also providing a relatively high void space (typically in the range of 50-98.5%). In preferred embodiments, the average loop diameter is less than 0.25 inches. In use, the heat transfer device is preferably designed to provide a balance between the void space and total wire surface area such that food drippings passing through multiple layers of mesh will disperse as a film upon hitting the upper layers and vaporize before exiting through the lower layers.

Further still, open knitted wire provides improved stability over conventional woven wire meshes as the knitted wire has no bonded or welded surfaces that may degrade after repeated heating and contraction during use. That is, any thermal expansion and contraction of the wire will not place thermal stress on any contact points between adjacent wires. This feature provides the further advantage of the heat transfer device being compressible in each of the directions shown as X, Y and Z (mainly X) in FIG. 1A.

In a preferred embodiment, the mesh is knitted from stainless steel wire such as 304 L or 316 L. The use of stainless steel wire improves the durability of the heat transfer device by minimizing the formation of rust, which can otherwise result from weathering. Other materials that withstand the heating and cooling cycle and are malleable for forming can be used.

In the embodiment shown in FIG. 1A, the heat transfer device includes one or more layers of wire mesh fixed within a frame or laying on top of a frame corresponding to the shape and size of a barbeque. In the embodiment shown, the frame includes rigid frame ends 34, and may include flexible wire frame sides 33. Thus, the frame ends 34 provide structural support in a first dimension Y, while the wire sides 33, if present, maintain the flexibility of the wire mesh in a second dimension X. This flexibility permits simple mechanical removal of carbon debris from the mesh as will be described below.

Figure 2A:
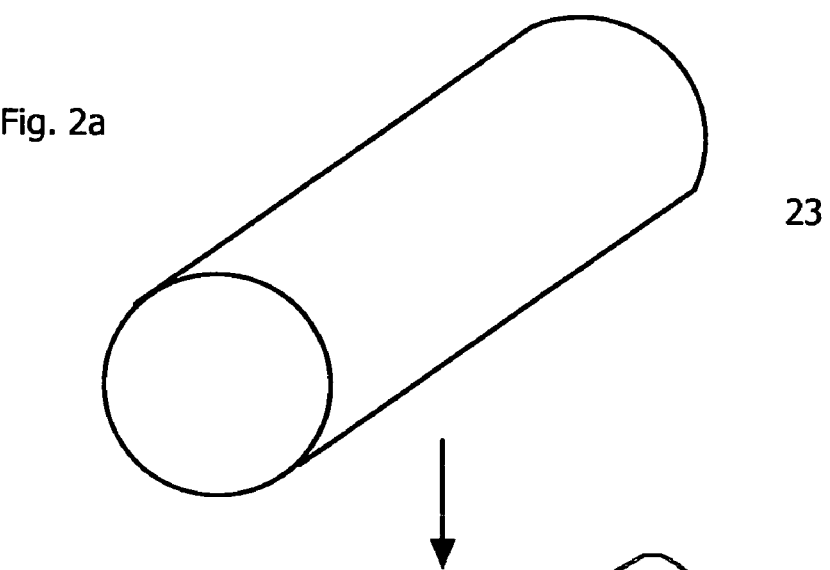
FIG. 2A is a schematic perspective view of a section of cylindrical knitted wire mesh.
Figure 2B:
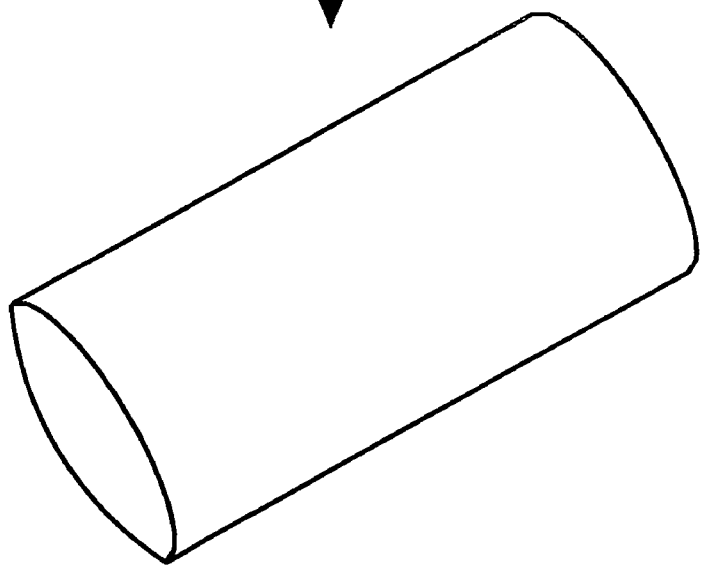
FIG. 2B is a schematic perspective view of cylindrical knitted wire mesh that has been flattened into a dual layered mesh in accordance with one embodiment of the invention.

The heat transfer device can also be self supporting if it is fixed at either end of the barbecue or is formed from wires or layers of wires of sufficient structural rigidity to self-support the heat transfer device within a barbeque Production of Wire Mesh Layers Suitable wire mesh structures for use in accordance with the invention may be produced by known wire knitting techniques and machinery. For example, and with reference to FIG. 2A, it is preferred that cylinders produced on circular knitting machines are used in manufacturing the heat transfer device. A cylinder so produced may be flattened to produce a dual layer of mesh (as shown in FIG. 2B), which may be used alone or layered. The flattened cylinder(s) may be affixed within a frame sized to fit a particular type of barbecue as described above. Alternatively, cylinder layers may be fastened together by other suitable means such as stapling or crimping with stainless steel staples or wire to prevent unravelling and separation of the layers.

Clearly, various sizes and shapes of mesh may be made in accordance with the invention, which may be designed for use with certain makes and models of barbecue. Such shapes may be cut from a sheet or cylinder of wire mesh, with the loose ends of each mesh layer secured by welding or other means. However, it is preferable to form the wire mesh from an appropriately sized flattened cylinder as described above, as this will prevent unravelling of the sides of the wire mesh and therefore frame sides 33 will not be required.

Although a single or dual layer of mesh may be used in accordance with the invention, it is preferable that several sheets of mesh be layered over the heat source and beneath the food grill. While each layer of mesh will have a large total void space, multiple layers of mesh will provide an increased surface area upon which to collect and vaporize falling food drippings. In various embodiments of the invention, up to 30 layers of wire mesh may be used, although the optimal number of layers will be determined based on the particular characteristics of specific barbeques.

In addition, once the wire mesh is formed by knitting, the wire loop can be elongated or stretched to form the appropriate dimensions for the barbecue and/or the optimum densities required to allow the cooking characteristics of vaporizing the drippings, allowing quick response to heat input and produce infrared radiant heat for cooking.

In still further embodiments, the wire mesh can be crimped at appropriate angles and then layered upon each other to give a variety of densities for specific barbecues. The crimped layers can also be used in conjunction with uncrimped layers or other crimped layers having similar or differing crimping angles.

In still further embodiments, a "window strip" as shown in FIG. 3 can be knitted into the mesh to allow a better visual picture of the ignition state of the burner or to accommodate the particular design of a barbeque or the particular combustion functionality of the burner of a barbeque. The window strip can be produced by dropping stitches during knitting.

Further still, the wire mesh can be knitted in a narrower strip 40 (typically ¼"-2" wide) and then formed to the final structure by placing the mesh on its side in either a crimped form or a flat form and layering it back and forth as shown in FIGS. 4A and 4B. In this embodiment, the layers of flattened wire mesh are oriented perpendicularly to the vertical. A frame 42 may be utilized to secure the layers of wire mesh.

In yet another embodiment, void spaces may be incorporated between different layers of the wire mesh.

Use of the Heat Transfer Device

In use, a heat transfer device in accordance with the invention is placed above the burner of a barbecue and below the food grill. When the barbecue is lit, the burner will heat a portion of the heat transfer device. Under most heating conditions, the layers of wire loop in closest contact to the burner flame will be heated to a red hot temperature, thus becoming an infrared heating source for cooking the food. Due to the looped nature of the wire mesh, the heat from within the wire will be quickly dissipated throughout the heat transfer device thus providing an evenly heated surface. Similarly any adjustments to the heating temperature will result in a rapid change in the heating temperature.

For those foods with any of fats, juices, marinades or sauces, as the food cooks, these substances will drip from the food and contact the wire mesh and will either be burnt or vaporized to impart a barbecue/smoked flavour to the meat. During use, a certain amount of carbon debris will become lodged within the mesh layers of the heat transfer device. The user may remove this debris by simple mechanical manipulation of the mesh structure such as by shaking or banging the heat transfer device against a surface.

As noted above, the open wire loop structure of the heat transfer device provides flexibility in the X and Y and Z dimensions such that repeated expansion and compression of the void space between the knitted loops readily displaces any residual burnt carbon debris. Alternatively, repeated physical vibrations caused by forceful contact with any surface would similarly dislodge any residual burnt carbon debris. In comparison to a woven wire structure, the knitted loop structure will prevent holes forming within the mesh by the displacement of overlapping wires with respect to one another as may occur with woven meshes. Still further, the knitted structure allows the void space area to change for cleaning which will then return to the original shape. In comparison, a mesh with overlapping wires will have a fixed hole size and result in clogging of the mesh.

Heat Transfer Device Kit

Figure 5A:
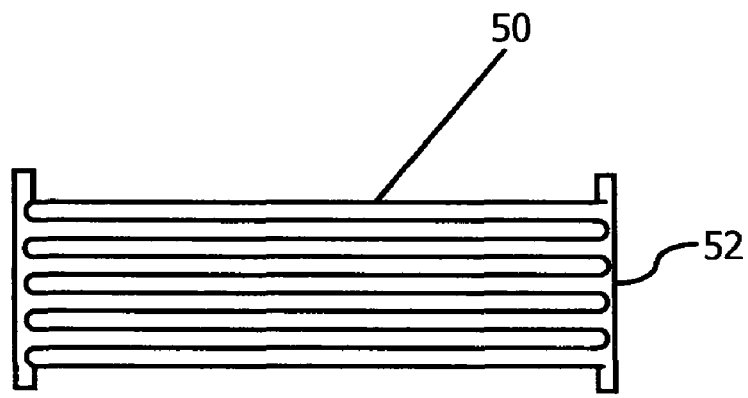
FIG. 5A is a schematic diagram of a heat transfer device kit with a single overlapped layered loop structure in accordance with one embodiment of the invention.

The present device may be provided to users as a kit. As shown in FIG. 5A, a kit can be as simple as a long length of knitted material 50 that can be folded to the recommended size (width and depth) for a particular barbecue. The folded structure can be held together by either permanent or removable staples or a frame 52. In such an embodiment, a user could form multiple layers of wire mesh over an existing lava rock layer or directly on top of the barbeque burners or lay directly on top of the metal plates found in present barbecues.

Figure 5B:
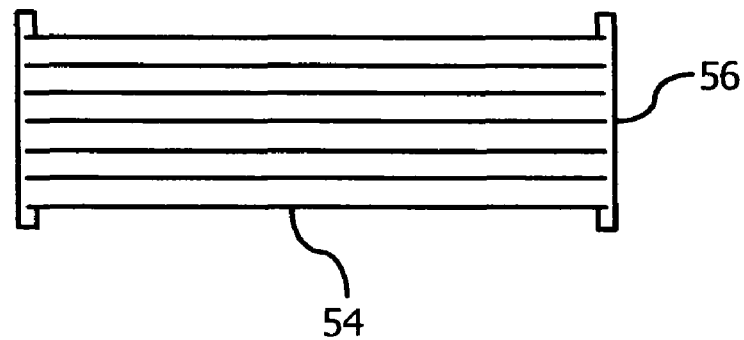
FIG. 5B is a schematic diagram of a heat transfer device kit with a multiple overlapped layered loop cylinders in accordance with one embodiment of the invention; and, FIG. 5C is a schematic diagram of a self-supporting heat transfer device kit in accordance with one embodiment of the invention.

In another embodiment as shown in FIG. 5B, a kit for making a custom heat transfer device may include pre-cut cylinders 54 of wire mesh and an appropriate end crimping or clamping system 54 for allowing a user to assemble a desired number of layers of wire mesh for their particular barbeque.

Figure 5C:
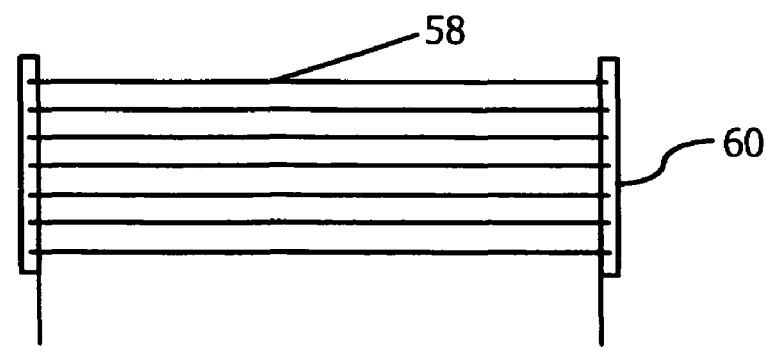

In another embodiment as shown in FIG. 5C, a kit may comprise pre-formed layers of wire mesh 58 and a support system 60 (or equivalent) for supporting the wire mesh on the lower surface of the barbeque above the barbeque burner such that a supporting grid is not required.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A heat transfer device for use within a barbeque comprising at least two flattened cylinders of an open loop knitted wire mesh and a clamping system attached to the at least two flattened cylinders for securing the at least two flattened cylinders together in a generally planar configuration that maintains compressibility of the at least two flattened cylinders in at least one dimension to enable individual open loops of the open loop knitted wire mesh to compressibly move with respect to one another for dislodging debris, the heat transfer device for placement over a barbeque heat source and having a surface area and void space effective for conducting and radiating thermal energy and for vaporizing food juices from cooking food.

2. A heat transfer device as in claim 1 wherein the at least two flattened cylinders have first and second open ends and the clamping system is a frame operatively clamping the first and second open ends.

3. A heat transfer device as in claim 1, wherein the wire is a stainless steel wire.

4. A heat transfer device as in claim 1 wherein the open loop wire mesh includes at least two strands of wire.

5. A heat transfer device as in claim 4 wherein the at least two strands of wire are dissimilar materials.

6. A heat transfer device as in claim 2, wherein the wire is a 304 L or 316 L stainless steel wire.

7. A heat transfer device as in claim 1 wherein the open loop wire mesh is crimped.

8. A heat transfer device as in claim 1 wherein the void space is 50-98.5%.

9. A heat transfer device as in claim 1 wherein the void space is 90-98.5%.

10. A heat transfer device for a barbeque comprising:
    a length of an open loop knitted wire cylinder, the open loop knitted wire cylinder having a flexibility allowing multiple layers of wire to be layered back and forth across one another;
    a clamping system attached to the multiple layers of wire for clamping the multiple layers of wires together in a generally planar configuration that maintains compressibility of the multiple layers of wire in at least one dimension to enable individual open loops of the open loop knitted wire cylinder to compressibly move with respect to one another for dislodging debris, the heat transfer device for placement over a barbeque heat source and having a surface area and void space effective for conducting and radiating thermal energy and for vaporizing food juices from cooking food.

11. A heat transfer device for a barbeque comprising:
    a plurality of flattened open loop knitted wire cylinders; and, an end clamping system attached to the flattened open loop knitted wire cylinders for clamping the plurality of open loop knitted wire cylinders together in a generally planar configuration that maintains compressibility of the plurality of open loop knitted wire cylinders in at least one dimension to enable individual open loops of the open loop knitted wire cylinder to compressibly move with respect to one another for dislodging debris, the heat transfer device for placement over a barbeque heat source and having a surface area and void space effective for conducting and radiating thermal energy and for vaporizing food juices from cooking food.

12. A heat transfer device as in claim 1 wherein the open loop knitted wire mesh includes a window within the open loop knitted wire mesh formed by dropping stitches during knitting.

13. A heat transfer device as in claim 1 wherein the clamping system are staples.

* * * * *